United States Patent

[11] 3,620,237

[72] Inventors: John Henry Sindall, Worcester; Frederick Charles Dixon, Chester, both of England
[21] Appl. No. 831,176
[22] Filed: June 6, 1969
[45] Patented: Nov. 16, 1971
[73] Assignee: Imperial Metal Industries (Kynoch) Limited, Birmingham, England
[32] Priority: June 12, 1968
[33] Great Britain
[31] 27,904/68

[54] SAFETY VALVE
4 Claims, 5 Drawing Figs.

[52] U.S. Cl. .......................................... 137/67, 137/70, 251/73
[51] Int. Cl. .......................................... F16k 17/00
[50] Field of Search .......................................... 137/53.15 UX, 67–71; 220/89 A; 169/20; 251/73

[56] References Cited

UNITED STATES PATENTS

| | | | |
|---|---|---|---|
| 532,874 | 1/1895 | Gray | 169/20 |
| 2,673,660 | 3/1954 | Nordin | 137/67 X |
| 1,954,285 | 4/1934 | Denk et al. | 220/89 A |
| 3,209,937 | 10/1965 | Hirst et al. | 137/70 X |
| 3,410,304 | 11/1968 | Paul | 251/73 X |
| 3,426,779 | 2/1969 | Corbin | 137/68 |

Primary Examiner—M. Cary Nelson
Assistant Examiner—Richard Gerard
Attorney—Cushman, Darby & Cushman ABSTRACT: A safety valve comprising a piston slidably engaged within a bore for a housing and having releasable retaining means holding the piston against the effect of pressurized fluid, and further means responsive to a precalculated change of pressure to release the retaining means and release the fluid.

SAFETY VALVE

BACKGROUND OF THE INVENTION

This invention relates to safety valves and in particular, but not exclusively, to safety valves for fire-extinguishing purposes.

A typical application of the invention is for the rapid quenching of a fire resulting from premature ignition of a rocket motor which may accidentally ignite, either through internal malfunction or through external causes. Such ignition can be exceedingly dangerous, for example, should it take place in a rocket magazine.

SUMMARY OF THE INVENTION

According to the present invention a safety valve comprises a housing having a bore, a piston slidably engaged within the bore, releasable retaining means normally to retain the piston in a predetermined position axially of the bore, against the effect of pressurized fluid to retain the fluid in the valve, and pressure responsive means responsive to a precalculated change of pressure to release the retaining means and allow movement of the piston along the bore and thereby to release the fluid from the valve.

The releasable retaining means may comprise a collapsible member which extends across the bore of the housing adjacent an end of the piston.

Preferably, the collapsible member has end surfaces which extend between ball elements, each ball element being seated partly in the wall of the bore of the housing. With this arrangement it is further preferable that said end surfaces of the collapsible member are each recessed to receive a segment of a ball element.

The collapsible member may be initially rigid but deformable in which case the member may be collapsed by bending thereof. Alternatively, the member may be rigid and brittle, in which case the member is collapsed by being fractured.

In other forms of the invention the collapsible member may comprise two portions pivoted together, for example by a ball and socket joint, a pivot pin, or a hinge arrangement, so that the portions may be set in a straight "rigid" position but which collapse on the application of a load applied transversely to the member by the releasing means.

The collapsible members may be utilized with or without the accompaniment of ball elements. If ball elements are not employed, the length of the collapsible member may be designed such that the ends of the member engage with the wall of the bore with sufficient frictional engagement, or the ends of the member locate directly in suitable depressions provided in the wall of the bore. A resilient telescopic device may be incorporated in the collapsible member to provide a predetermined axial force between the ends of the member and valve surfaces cooperable therewith.

The means for releasing the retaining means may comprise a plunger located adjacent the collapsible member of the retaining means so that an increase of pressure of precalculated magnitude transmitted to the plunger will cause the collapsible member to collapse thereby allowing the piston the move along the bore in the housing.

An increase of pressure is conveniently transmitted to the plunger by means of a plate at one end of the plunger.

BRIEF DESCRIPTION OF THE DRAWINGS

In order to make the invention more clearly understood, embodiments of the invention will now be more particularly described by way of examples only, with reference to the accompanying drawings in which.

DESCRIPTION OF THE PREFERRED EMBODIMENTS

Figure 1:
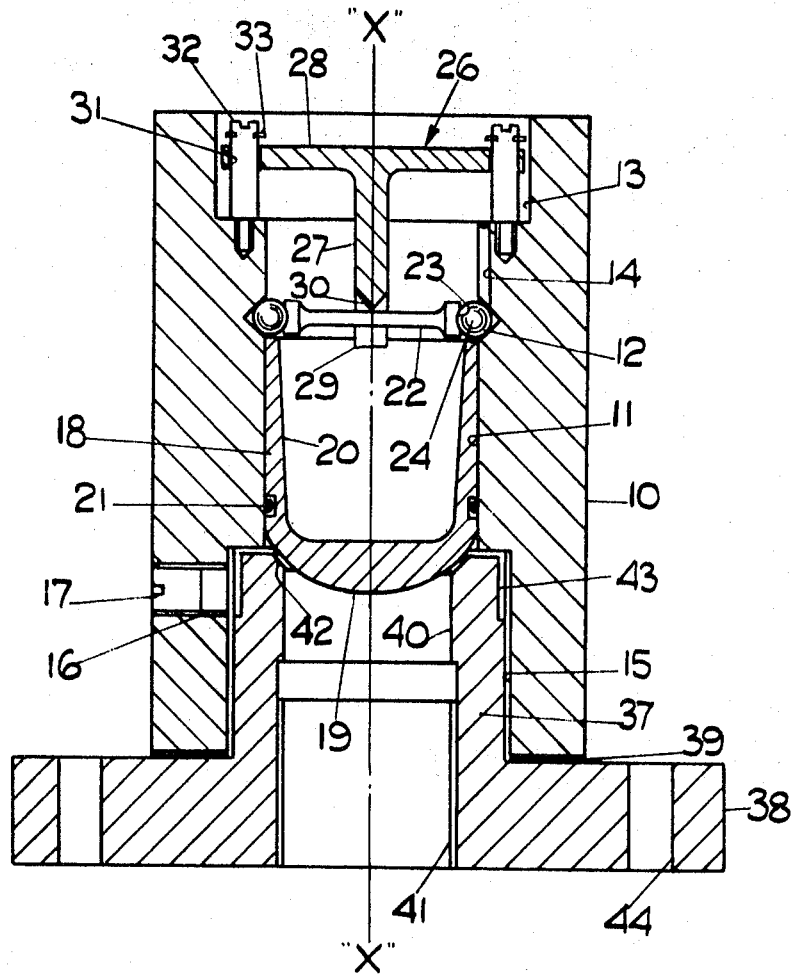
FIG. 1 is a sectional view of a valve according to a first embodiment.

Referring to FIG. 1 of the drawings, a safety valve of a first embodiment comprises a housing 10 which is of circular cross section normal to the longitudinal axis 'X—X' and has an axial bore 11 provided therein. A circumferential V-shaped groove 12 is machined in the wall of the bore 11. The upper end of the bore 11, as viewed in FIG. 1, is counterbored at 13. At one point around the circumference the counterbore 13 is connected to the groove 12 through a slot 14. The lower end of the bore is counterbored at 15, this lower counterbore being internally screw-threaded. A screw-threaded hole 16 extends radially from the counterbore 15, through the housing 10 for the reception of an air bleed valve 17.

A piston 18, substantially U-shaped in cross section, comprises a domed end 19, and a skirt 20 in sliding engagement with the wall of the axial bore 11. An O-ring seal 21 is located in a peripheral groove in the skirt 20 to provide a fluid tight seal between the piston and the wall of the axial bore 11.

Releasable retaining means for the piston 18 are provided in the form of an elongate collapsible member 22 having concave end surfaces 23, and ball elements 24. The length of the member 22, the diameter of the ball elements 24 and the configuration of the groove 12 are suitably dimensioned such that the member 22 extends diametrically across the axial bore 11 and between the ball elements when the elements are located in the groove 12. It is preferable that the center of each ball element lies within the diameter of the bore 11, i.e. the pitch circle diameter of the ball elements is less than the diameter of the axial bore 11.

In order to assemble the collapsible member 22 and ball elements 24 in the valve, one ball element is seated in the groove 12 opposite the slot 14. One end of the collapsible member is positioned against said one ball element and a second ball element is inserted between the other end of the collapsible member and the slot 14 and into the groove 12. The collapsible member is then rotated approximately 90° to move the ball elements along the groove 12 to position the ball elements circumferentially away from the slot 14.

Means for releasing the collapsible member 22 comprises a plunger 26 comprising a shank 27 and a flange plate 28 at one end thereof. The other end of the shank is bifurcated as at 29 and the base of the bifurcation has sloping sides to form a V-shaped wedge 30 which rests on the collapsible member 22. The plate 28 has four equiangularly spaced holes 31 which enable the plate to be guided concentrically within the counterbore 13 along guide pins 32 secured in the base of the counterbore 13. Circlips 33 are provided around the pins 32 above the flange 28 to prevent movement of the plunger 26 axially outwardly of the housing when the valve is not in use.

The screw-threaded counterbore 15 of the housing 10 is screwed onto a spigot 37 of a base 38, a fluid tight sealing washer 39 being interposed between the end of the housing and the base. An axial bore 40 in the base and of smaller diameter than that of the axial bore 11 in the housing, is internally screw-threaded at one end 41, and the wall of the bore at the other end thereof is chamfered at 42 to limit axial movement of the piston in one direction. The end of the spigot is slightly reduced in diameter as indicated at 43 to provide a communication between the bore 40 and the air bleed valve 17. A number of bolt holes 44 are provided in the base 38.

In use the base 38 is connected to a supply of high pressure water and the circlips 33 removed from the pins 32. In the event of increased pressure, typically of approximately 5 p.s.i. or greater, being applied to the outer surface of the flange plate 28, plunger 26 is displaced thereby causing the wedge 30 to deform the collapsible member 22. The ball elements 24 are then no longer held in the groove 12 so that the pressure of the water against the domed end of the piston will eject the piston and thereby the plunger 26 from the housing so that water will issue from the axial bore 11.

Figure 2:
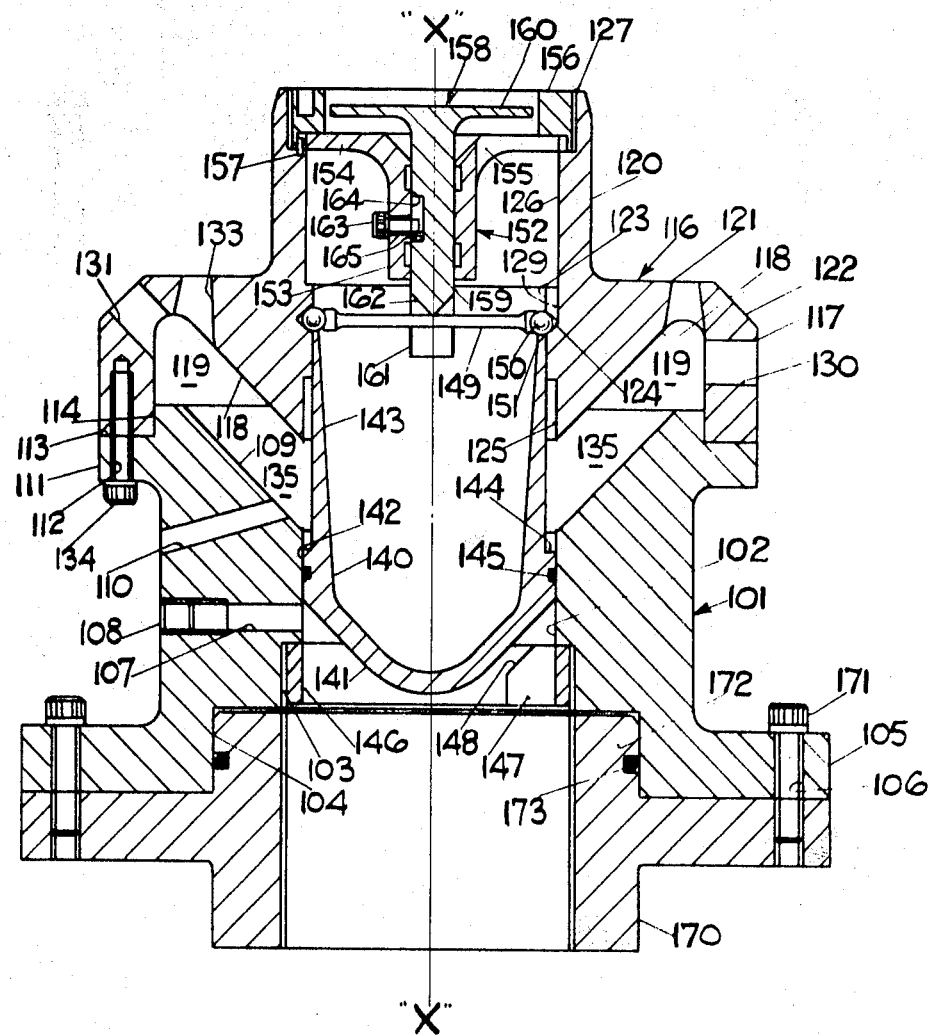
FIG. 2 is a sectional view of a valve of a second and preferred embodiment taken along line '2—2' of FIG. 3 and showing a piston in a first position.
Figure 3:
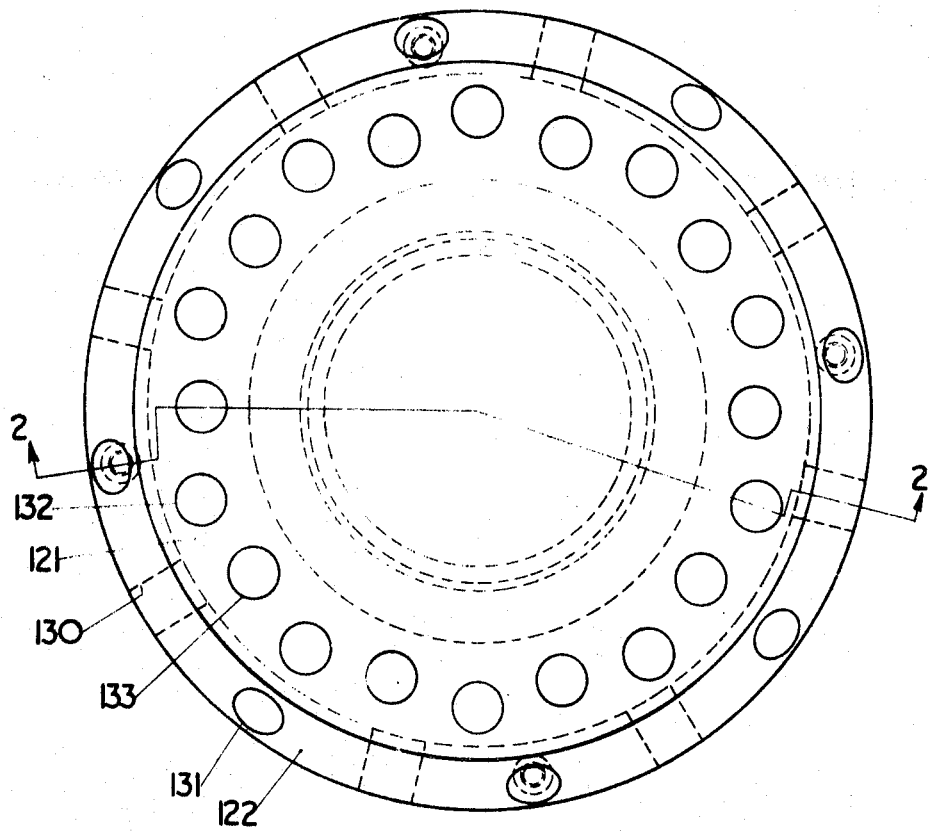
FIG. 3 is a plan view of the valve of the second embodiment.
Figure 4:
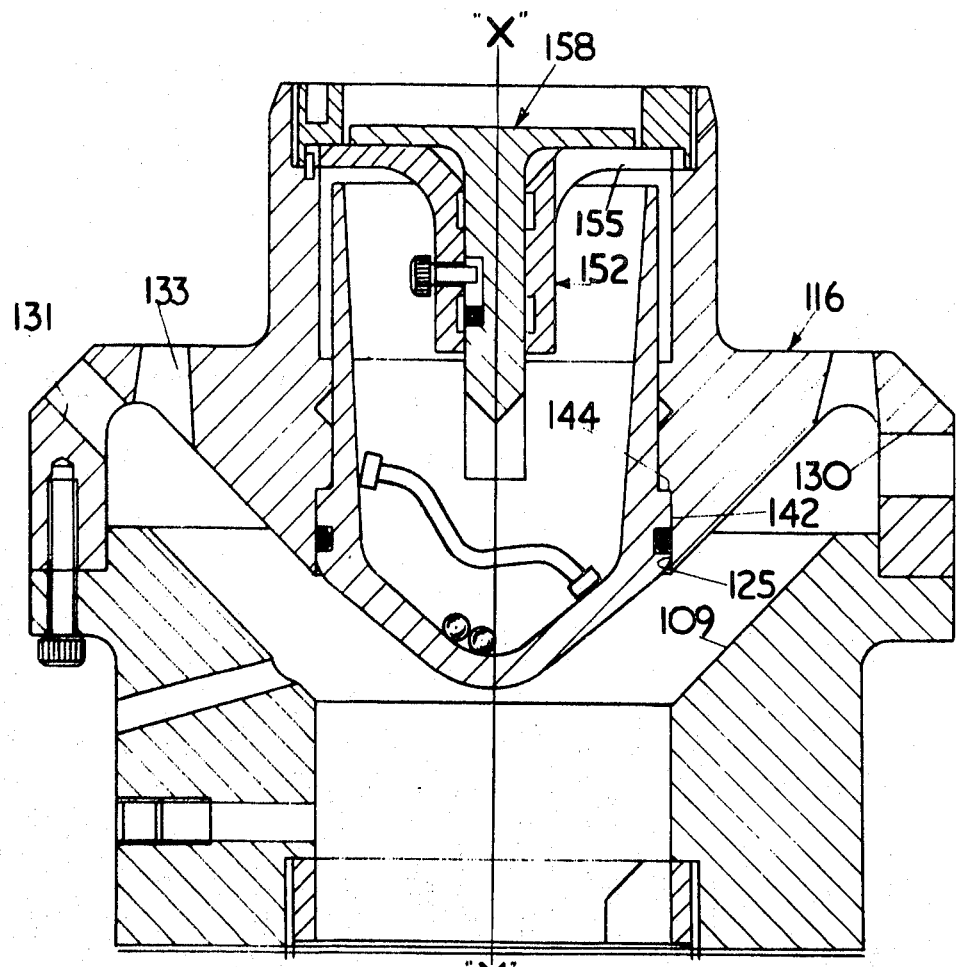
FIG. 4 is a view similar to FIG. 2 but showing the piston in a second position.

In a second and preferred embodiment, illustrated in FIGS. 2 to 4, a safety valve comprises a housing 101 which is of circular cross section normal to the longitudinal axis 'X—X', and has an axial bore 102 provided therein. Two counterbores 103, 104 are provided at one end of the housing, the axially inner counterbore 103 being internally screw-threaded. An outwardly extending flange 105 is provided at said one end of the housing and has a series of equiangularly spaced bolt holes 106. A hole 107 extends radially from the bore 102 through the housing 101 and is screw-threaded at its radially outer end for the reception of an air bleed valve 108.

At the other end of the housing, there is provided a conical recess 109 contiguous with the bore 102. A vent 110 extends from the recess 109 to the exterior of the housing and is inclined towards the flange 105. An external flange 111 is provided at said other end of the housing and is recessed as at 113 to provide an axially projecting annular spigot 114. The flange 111 has a series of equiangularly spaced bolt holes 112.

An end cover 116 for the housing 101 comprises an annular rim 117 provided around one side of the base of a frustoconical body portion 118, the rim and conical body portion defining therebetween an annular recess 119. Extending coaxially from the base of the conical body portion but on the opposite side from the rim 117 there is a head portion 120 of smaller outer diameter than that of the rim 117 so as to provide an annular shoulder 121. The rim is chamfered as indicated at 122. The end cover is bored to provide an axial bore 123 of slightly smaller diameter than that of the axial bore 102 of the housing 101, and a circumferential V-shaped groove 124 is machined in the wall of the bore 123.

The frustoconical body portion 118 is counterbored as at 125 to the same diameter as that of the axial bore 102 of the housing 101. The head portion 120 is provided with axially inner and outer counterbores 126, 127 respectively, the outer counterbore being screw-threaded. At one point around its circumference the counterbore is connected to the groove 124 through a slot 129 of the same depth as that of the groove 124.

Referring particularly to FIGS. 2 and 3, from the annular recess 119, four series of orifices extend through the end cover 116. Each of a first series of eight orifices 130 extends radially through the rim 117 at equiangular positions. Each of a second series of eight orifices 131 extends at an angle of 45° to the axis 'X—X' and emerges from the chamfered surface 122.

Two series of orifices 132, 133 (of ten orifices each) extend through the conical body portion 118 and emerge at the shoulder 121. The orifices 132 extend parallel with the axis 'X—X' and the orifices 133 are each inclined slightly towards the axis 'X—X'. The orifices 132 and 133 are given the generally converging shaping shown in FIG. 2 to promote maximum flow efficiency therethrough. As will be seen from FIG. 3, the orifices of each series are equiangularly spaced. The first and second series of orifices 130, 131 are interspaced with respect to one another, and the two series of orifices 132, 133 are interspaced with respect to one another.

The end cap 116 is assembled to the housing 101 by clamping the rim 117 around the spigot 114 and to the flange 111 by screws 134. In this position the conical body portion 118 partially enters the conical recess 109 to provide an annular outlet port 135.

A piston 140, substantially U-shaped in cross section, is disposed within the housing 101 and the end cover 116 and comprises a domed forward end 141, a cylindrical wall 142 in sliding engagement with the wall of the axial bore 102 and a skirt 143, in sliding engagement with the wall of the smaller axial bore 123 of the end cover. A change in diameter between the axial length 142 and the skirt 143 occurs at a shoulder 144. A O-ring seal 145 is located in a peripheral groove in the cylindrical wall 142 to provide a fluid tight seal between the piston and the wall of the axial bore 102.

An externally screwed ring 146 comprising a radially inwardly extending lug 147, chamfered at one side 148, is screwed into the counterbore 103, whereby the lug 147 forms an abutment for the domed end of the piston in a circumstance described below.

Releasable retaining means for the piston 140 are provided in the form of an elongate collapsible member 149 having concave end surfaces 150, and ball elements 151. The length of the member 149, the diameter of the ball elements 151 and the configuration of the groove 124 are suitably dimensioned such that the member 149 extends diametrically across the axial bore 123 and between the ball elements when the elements are seated in the groove 124. It is preferable that the center of each ball element lies within the diameter of the bore 123, i.e. the pitch circle diameter of the ball elements is less than the diameter of the axial bore 123. The collapsible member 149 and ball elements 151 are assembled in the valve in a similar manner to that described in the first embodiment.

In the head 120 of the end cover 116 there is disposed a plunger guide member 152 comprising a body 153 and an end flange 154 of which the latter has three equiangularly spaced apertures 155 therein. The flange locates against the base of the counterbore 127 and is held in position by a locking ring 156. The guide member is prevented from rotating withing the head by means of a pin 157. An axial bore of the guide is internally recessed to minimize contact with a plunger 158 and thereby eliminate any need for lubrication. The plunger 158 comprises a shank 159 and a flange plate 160, the shank being slidably located in a loose manner in the guide member 152. The end of the shank remote from the flange is bifurcated as at 161 and the base of the bifurcation has sloping sides to form a V-shaped wedge 162. When the shank 159 is slidably engaged in the guide member 152, the bifurcated end straddles the collapsible member 149 and the wedge rests against the member 149. In this position the flange plate 160 is spaced from the flange 154. A screw 163 is in screw-threaded engagement in the guide member 152, and projects into a slot 164 provided in the shank 159 thereby to limit axial movement of the plunger 158. A rubber buffer 165 is located at one end of the slot 164 and is lightly compressed between the latter and the screw 163 to damp out the possible effects of vibration on the plunger.

Various materials may be employed for the parts of the valve but a typical valve construction may comprise a phosphor bronze body, end cover, guide member, plunger and locking ring; an aluminum piston (alternatively titanium or phosphor bronze), steel ball elements, a mild steel collapsible member, and a p.t.f.e. or elastomeric O-ring seal.

With regard to the collapsible member 149, a cross section is determined based upon the physical properties of the metal and which will enable the member to collapse upon the application of a predetermined load by the plunger 158.

A typical application of the valve of the second embodiment will now be described.

The valve is located adjacent the rear end of a rocket motor (not shown) so that the flange plate 160 of plunger 158 is opposed to the exhaust of the rocket. At this stage the piston 140 is prevented from leaving the lower end of the valve by abutment of the domed end of the piston with the lug 147 of the ring 146. The valve is connected to a supply of high-pressure water (100–200 lb./sq. inch) by means of an adapter 170 which is clamped to the flange 105 of the housing 101 by screws 171. A part 172 of the adapter locates in the counterbore 104 and a fluid tight connection is ensured by means of an O-ring seal 173. The air bleed valve 108 is operated to release air trapped below the piston 140. Pressure of the water against the domed end 141 of the piston 140 moves the piston from the lug 147 so that the end of the skirt 143 abuts the ball elements 151. In this first position of the piston, the sealing arrangement of the cylindrical wall 142 in the bore 102 prevents water escaping through the outlet port 135. Any slight leakage of water past the seal is able to escape through the vent 110 which will also drain away any rainwater which enters the port 135 through the orifices 131, 132 and 133.

In the event of the rocket motor being prematurely fired, either by its own malfunction or by external causes such as damage to a magazine containing the rocket, the pressure of the exhaust gases will thrust against the flange plate 160 of the plunger 158 and displace the plunger 158, thereby causing the wedge 162 to bend the collapsible member 149 which falls to the lower end of the piston. The ball elements 151 are then no longer held in the groove 124, so that the pressure of the water will immediately move the piston 140 towards the head 120. This movement of the piston displaces the ball elements 151 from the groove 124, and the piston moves along the axial bores 102 and 123 from its first position, to a second position illustrated in FIG. 4 in which the cylindrical wall 142 locates within the counterbore 125 and the shoulder 144 abuts the base of the counterbore 125, thereby allowing water to pass through the outlet port 135 and to escape through the four series of orifices 130 to 133. Air behind the piston is vented through the apertures 155. By virtue of the design and disposition of the orifices the water is emitted as jets which impinge one with another to produce a spray which rapidly envelops and extinguishes the fire.

Instead of water, other fire-extinguishing media may, of course, be used, for example gas suppressants or foam producing compositions.

It will be appreciated that by virtue of the arrangement of the flange plate 160, plunger 158 and collapsible member 149 a very rapid response is achieved by the valve to a predetermined rise in pressure against the flange plate 160. In a typical example, a pressure of 6 p.s.i. on the flange plate 160 results in a force applied to the member 149 sufficient to collapse it. The resulting mechanical response time of the valve is of the order of 3 milliseconds, dependent upon the pressure beneath the piston 140.

Figure 5:
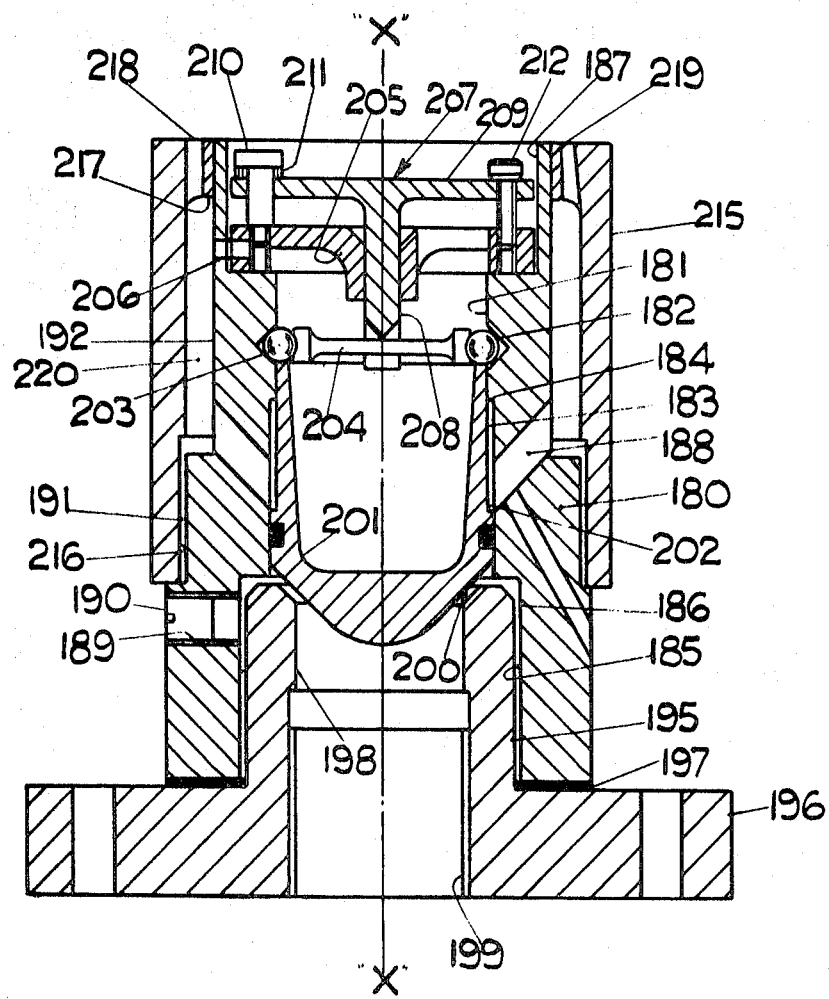
FIG. 5 is a sectional view of a valve of a third embodiment.

The third embodiment is illustrated in FIG. 5 of the drawings wherein a housing 180 has a bore 181 provided with a circumferential V-shaped groove 182. The bore 181 opens at one end into a bore 183 of slightly larger diameter to form a shoulder 184. The bore 183 opens into a screw-threaded recess 185. The other end of the bore 181 opens into a recess 187. Outlet ports in the form of inclined holes 188 extend from the bore 183 to the exterior of the housing. A screw-threaded hole 189 extends radially from the undercut 186 for reception of an air bleed valve 190.

The exterior of the housing has first and second stepped portions 191, 192 respectively, the first portion 191 being screw-threaded.

The threaded recess 185 is screwed onto a spigot 195 of a base 196, a fluid tight sealing washer 197 being located around the spigot. An axial bore 198 in the base is internally screw-threaded at one end 199 and at the other end opens into a conical recess 200.

A piston 201 of similar construction to that of the second embodiment and having a change of external diameter taking place at a shoulder 202 is located within the bore of the housing 181 and in a first position (as shown in the drawing) the piston is prevented from axial movement in one direction in the absence of water pressure by the conical recess 200 of the spigot 195. Axial movement of the piston in the other direction is prevented by abutment of the end of the skirt of the piston with ball elements 203 seated in the groove 182 and retained therein by a collapsible member 204 also of similar construction to that of the second embodiment.

A plunger guide member 205 is located in the recess 187 and is retained therein by radial pins 206. A plunger 207 has a stem 208 slidably engaged in the guide member 205 and a flange 209 movable along plain shank portions of screws 210. Rubber buffers 211 are positioned between the flange 209 and the heads of the screws 210. A locking screw 212 is threaded into both the flange 209 and the guide member temporarily to lock the plunger 207 in an inoperable position during transport of the valve.

A sleeve 215 has an internal screw thread 216 at one end engaged on portion 191 of the housing 180 and at the other end, a radially inwardly directed flange 217 which engages the end of the housing. The flange 217 has two series of orifices, a first series 218 extend through the flange 217 parallel with the longitudinal axis of the valve, and a second series 219 interspaced with those of the first series, each orifice 219 inwardly inclined towards the longitudinal axis 'X—X' of the valve. The length of the sleeve intermediate the flange 217 and the screw thread 216 is spaced from the housing to provide an annular chamber 220.

Operation of the valve is similar to that of the second embodiment. With the valve located in a required position and connected to a supply of high-pressure water, the locking screw 212 is removed. Upon the application of increased pressure to the plunger 207, the collapsible member 204 is collapsed allowing the piston rapidly to move, under the influence of the water pressure, along the bore 183 until the shoulder 202 of the piston contacts the shoulder 184 of the housing. This movement of the piston permits high-pressure water to flow through the inclined holes 188, annular chamber 220 and orifices 218, 219.

Safety valves in accordance with the present invention may also find application in chemical plant. For example a valve may be located externally of and opposite a bursting disc provided as a safety device in the wall of a pressure vessel. In the event of the bursting disc bursting, pressure of the fluid escaping from the vessel will actuate the valve and cause an appropriate liquid or suppressant foam to mix with the escaping fluid.

We claim:

1. A valve comprising a housing having a bore, the bore having an inlet and an outlet for fluid, a piston slidably engaged within the bore, at least one ball element seated in the wall of the bore and projecting from said wall normally to provide an abutment for one end of the piston, a collapsible member extending across the bore of the housing and adjacent an end of the piston to hold said at least one ball element seated in said wall thereby to retain the piston in a valve-closed position axially of the bore against the effect of pressurized fluid, and pressure-responsive means responsive to a precalculated change of external pressure to apply a load of precalculated magnitude to said collapsible member to cause collapse of said member and allow movement of the piston along the bore to a valve-open position thereby to release the fluid through the valve.

2. A valve according to claim 1 wherein the pressure responsive means comprises a plunger located adjacent the collapsible member so that an increase of pressure at or above a precalculated magnitude applied to the plunger causes the plunger to apply a load to said member sufficient to collapse said member and thereby allow the piston to move along the bore in the housing.

3. A valve comprising a housing have a bore, the bore having an inlet and an outlet for fluid, a piston slidably engaged within the bore and movable from a first position to a second position, the piston being releasably retained in said first position against the effect of pressurized fluid by releasably retaining means which comprises at least one ball element seated in the wall of the bore and projecting from said wall normally to provide an abutment for one end of the piston, and a collapsible member extending across the bore of the housing and adjacent an end of the piston to hold said at least one ball element seated in said wall thereby to retain the piston in its first position, pressure responsive means responsive to a precalculated change of external pressure to release the retaining means, and wherein the outlet is an outlet port extending from the bore to the exterior of the housing, the piston preventing escape of pressurized fluid through said port from the bore when the piston is in its first position, and the piston uncovering at least part of said port when the piston is in its second position.

4. A valve according to claim 3 wherein the pressure-responsive means comprises a plunger located adjacent the collapsible member so that an increase of pressure at or above a precalculated magnitude applied to the plunger causes the plunger to apply a load to said member sufficient to collapse said member and thereby allow the piston to move along the bore in the housing.

* * * * *